Patented Oct. 17, 1939

2,176,070

UNITED STATES PATENT OFFICE 2,176,070

ETHER-ESTERS OF ALKOXY-BENZOIC ACIDS

Ernest F. Grether and Russell B. Du Vall, Midland, Mich., assignors to The Dow Chemical Company, Midland, Mich., a corporation of Michigan No Drawing. Application February 3, 1938, Serial No. 188,470

7 Claims. (Cl. 260—473)

This invention concerns new ether-esters of alkoxy-benzoic acids, having the general formula:

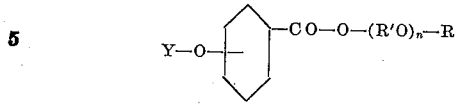

wherein Y represents an alkyl group, R' represents an alkylene group containing at least 2 carbon atoms, $n$ is an integer, and R represents an alkyl, aryl, or substituted aryl group.

The new compounds herein disclosed are useful as plasticizers in nitrocellulose, cellulose acetate, and cellulose ether, e. g. ethyl cellulose, compositions. They are compatible with such cellulose derivatives, substantially non-volatile at room temperature, soluble or miscible in the usual solvents or solvent mixtures for dissolving the cellulose derivatives, and they do not readily decompose or become discolored under the usual working conditions. Cellulose derivative compositions plasticized with the aforesaid new compounds are suitable for use in the preparation of artificial leather, lacquers, films, molded plastics, etc.

The ether-esters of alkoxy benzoic acids may be prepared by reacting an ether-ester of an hydroxy-benzoic acid, such as salicylic acid beta-ethoxy-ethyl ester, with an alkylating agent, such as diethyl sulphate, ethyl chloride, di-isopropyl sulphate, etc. The reaction is carried out by reacting the ether-ester with the alkylating agent in the presence of an inert solvent, such as ethyl alcohol, methyl alcohol, etc., and an alkali, such as sodium or potassium hydroxide. The alkylating agent is conveniently added to a mixture of the alkali, ether-ester, and solvent in small successive portions so as to maintain the reaction temperature preferably at approximately 15°–40° C., although this procedure may be varied. We prefer to use approximately chemical equivalents of the alkylating agent, alkali, and ether-ester, although other proportions may be used, if desired. When the alkylating agent has been added, the reaction mixture is warmed to 40°–80° C. in order to complete the reaction, after which it is diluted with water and extracted with a solvent, e. g. benzene. The solvent is distilled off and the product separated by fractional distillation.

In some cases it may be desirable to prepare the new compounds by esterifying an alkoxy-benzoic acid, e. g. o-methoxy-benzoic acid, with a glycol mono-ether, e. g. the mono-ethyl ether of ethylene glycol. The esterification is carried out in the usual manner by heating a mixture of the acid and the glycol mono-ether together with a small amount of a strong acid, such as sulphuric or benzene-sulphonic acid, at a reaction temperature, while distilling water from the mixture.

The following examples describe several ways in which the principle of the invention has been applied, but are not to be construed as limiting the same:

Example 1

42.0 grams (0.2 mole) of the beta-ethoxy-ethyl-ester of 4-hydroxy-benzoic acid and 11.2 grams (0.2 mole) of potassium hydroxide were dissolved in 45 cc. of 95 per cent ethyl alcohol. 32.0 grams (0.2 mole) of diethyl sulphate was added in five portions over a period of ½ hour. The temperature was maintained at 35°–40° C. by means of a cooling bath. After addition of the diethyl sulphate, the mixture was warmed at 60° C. for 10 minutes. It was then diluted with 200 cc. of water, and the product was extracted with benzene. Benzene was distilled from the extract and the residual product was purified by fractional distillation. There was obtained the beta-ethoxy-ethyl ester of 4-ethoxy-benzoic acid, a colorless liquid having a specific gravity of 1.073 at 20° C. and an index of refraction, $$n_D^{20} = 1.513$$

The product has the formula:

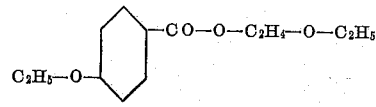

Example 2

A mixture of 304 grams (2 moles) of 2-methoxy-benzoic acid, 270 grams (3 moles) of the mono-ethyl ether of ethylene glycol and 4 grams of benzene-sulphonic acid was heated 6½ hours at 125°–140° C. During the heating, benzene was added drop-wise to facilitate vaporization of water from the mixture. The excess glycol-ether was distilled off under vacuum and the product dried over potassium carbonate. There was obtained the beta-ethoxy-ethyl ester of 2-methoxy-benzoic acid, a colorless liquid distilling at 135°–140° C. under 4 mm. pressure, and having a specific gravity of 1.115 at 20° C. and an index of refraction, $$n_D^{20} = 1.513$$

The product has the formula:

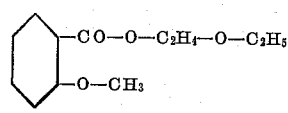

Example 3

200 grams (0.95 mole) of the beta-ethoxy-ethyl ester of 4-hydroxy-benzoic acid, and 40 grams (1.0 mole) of sodium hydroxide were dissolved in 330 cc. of 95 per cent ethyl alcohol. 126 grams (1.0 mole) of dimethyl sulphate was added in ten portions while maintaining a reaction temperature of 15°–25° C. by means of an ice bath. The mixture was then warmed on a steam bath to 60°–68° C. for ½ hour, cooled, dissolved in benzene, dried over calcium chloride, and fractionally distilled. There was obtained the beta-ethoxy-ethyl ester of 4-methoxy-benzoic acid, a colorless liquid distilling at 120°–130° C. under 2 mm. pressure, and having a specific gravity of 1.019 at 20° C. The product has the formula:

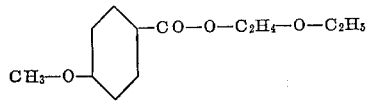

The beta-butoxy-ethyl ester of 2-ethoxy-benzoic acid, a colorless viscous liquid, was prepared by etherifying the beta-butoxy-ethyl ester of 2-hydroxy-benzoic acid with diethyl sulphate according to the procedure illustrated in the foregoing Examples 1 and 3.

Other ether-esters of alkoxy-benzoic acids may be prepared by reacting ether-esters of hydroxy-benzoic acids with an alkylating agent or by esterifying an alkoxy-benzoic acid with a glycol mono-ether in accordance with procedures hereinbefore described. For example, the beta-ethoxy-ethyl ester of 3-hydroxy-benzoic acid may be reacted with diamyl sulphate to produce the beta-ethoxy-ethyl ester of 3-pentoxy-benzoic acid; the beta-naphthoxy-ethyl ester of 2-hydroxy-benzoic acid with butyl chloride to produce the beta-naphthoxy-ethyl ester of 2-butoxy-benzoic acid; the phenoxy-ethoxy-ethyl ester of 4-hydroxy-benzoic acid with dimethyl sulphate to produce the beta-(phenoxy-ethoxy)-ethyl ester of 4-methoxy-benzoic acid; 3-propoxy-benzoic acid with the mono-isopropyl ether of trimethylene glycol to produce the gamma-isopropoxy-propyl ester of 3-propoxy-benzoic acid; 4-methoxy-benzoic acid with the mono-o-xenyl ether of ethylene glycol to produce the beta-o-xenoxy-ethyl ester of 4-methoxy-benzoic acid; 3-ethoxy-benzoic acid with the 2-chlorophenoxy ether of ethylene glycol to produce the beta-2-chlorophenoxy-ethyl ester of 3-ethoxy-benzoic acid; 2-methoxy-benzoic acid with the ethyl ester of tri-ethylene glycol to produce the omega-mono-ethyl ether of the triethylene glycol mono ester of 2-methoxy-benzoic acid; 2-ethoxy-benzoic acid with the 2-methyl-phenoxy ether of diethylene glycol to produce the beta-(beta-(2-methyl-phenoxy-)ethoxy-) ethyl ester of 2-ethoxy-benzoic acid; etc.

Other modes of applying the principle of our invention may be employed instead of those explained, change being made as regards the materials employed, provided the products stated by any of the following claims or the equivalent of such stated products be obtained.

We therefore particularly point out and distinctly claim as our invention:

1. A compound having the general formula:

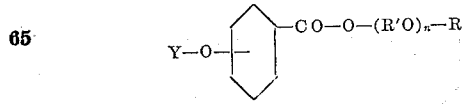

wherein Y represents a lower alkyl radical, R' represents a lower alkylene radical containing at least 2 carbon atoms, $n$ is a small integer, and R represents a radical selected from the class consisting of lower alkyl and aryl radicals.

2. A compound having the general formula:

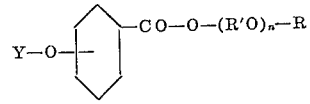

wherein Y and R each represents a lower alkyl group, R' represents a lower alkylene radical containing at least 2 carbon atoms, and $n$ represents a small integer.

3. A compound having the general formula:

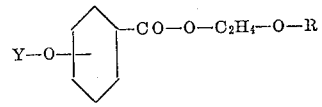

wherein Y represents a lower alkyl radical and R represents a radical selected from the class consisting of lower alkyl and aryl radicals.

4. A compound having the general formula:

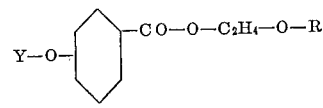

wherein Y and R each represents a lower alkyl radical.

5. The beta-ethoxy-ethyl ester of 4-ethoxy-benzoic acid, a colorless liquid having a specific gravity of approximately 1.073 at 20° C. and an index of refraction of $$n_D^{20} = 1.513$$

and having the formula:

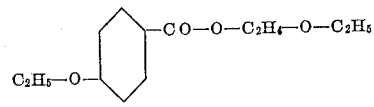

6. The beta-ethoxy-ethyl ester of 2-methoxy-benzoic acid, a colorless liquid distilling at 135°–140° C. under 4 millimeters pressure, having a specific gravity of approximately 1.115 at 20° C., and having the formula:

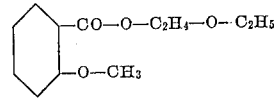

7. The beta-ethoxy-ethyl ester of 4-methoxy-benzoic acid, a colorless liquid distilling at 120°–130° C. under 2 millimeters pressure, having a specific gravity of 1.109 at 20° C., and having the formula:

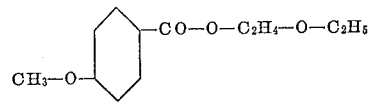

ERNEST F. GRETHER.
RUSSELL B. DU VALL.